April 22, 1941.  C. E. SHEETS  2,239,020
POULTRY COOP
Filed March 6, 1939  2 Sheets-Sheet 1
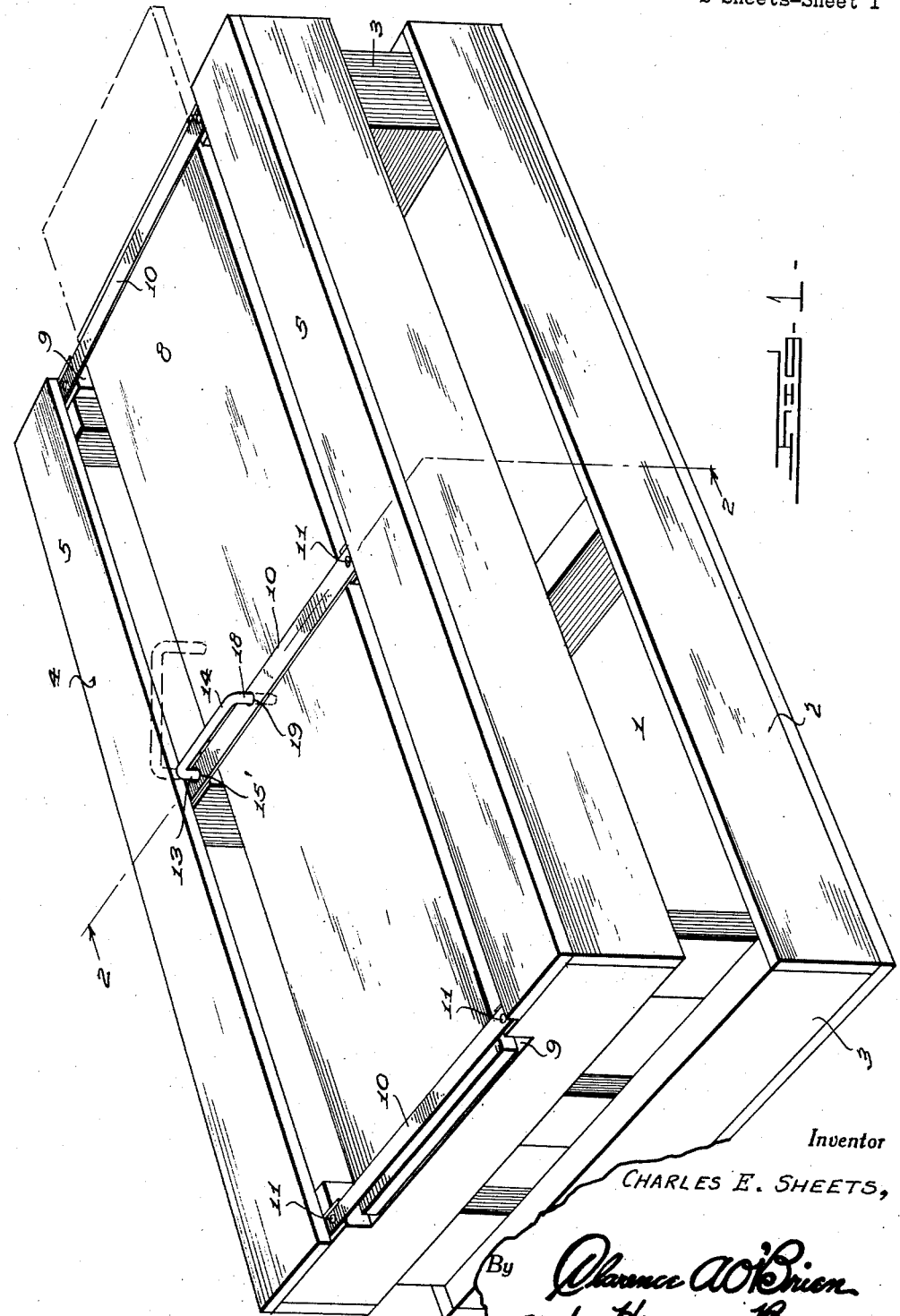
Inventor
CHARLES E. SHEETS,
By Clarence A. O'Brien
and Hyman Berman
Attorneys April 22, 1941.   C. E. SHEETS   2,239,020
POULTRY COOP
Filed March 6, 1939   2 Sheets-Sheet 2
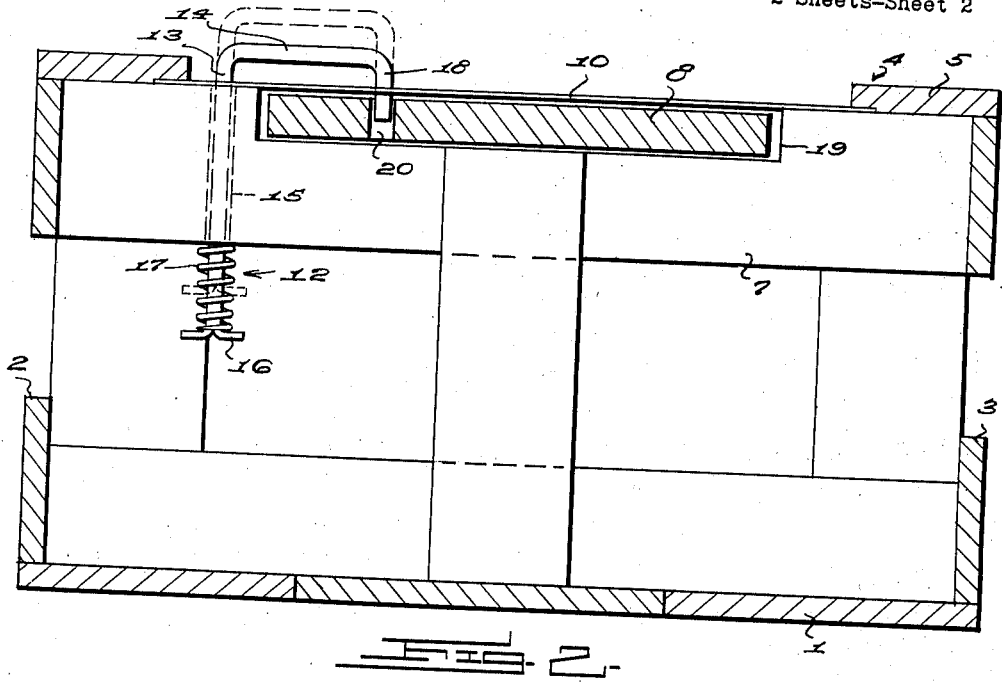
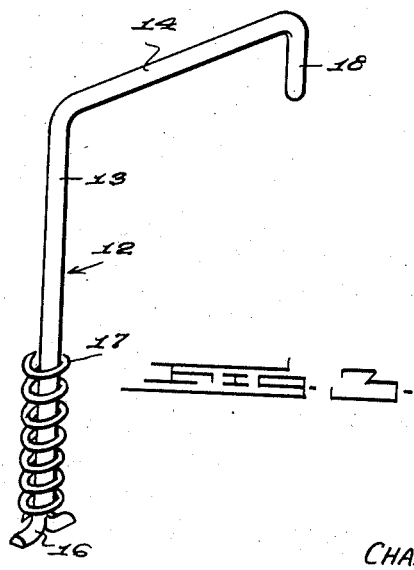
Inventor
CHARLES E. SHEETS,
By Clarence A. O'Brien
and Hyman Berman
Attorneys Patented Apr. 22, 1941

2,239,020

UNITED STATES PATENT OFFICE 2,239,020

POULTRY COOP

Charles Edgar Sheets, Trenton, Mo.

Application March 6, 1939, Serial No. 260,231

1 Claim. (Cl. 217—62)

My invention relates to improvements in poultry coops and more particularly to closure latches therefor.

The principal object of the invention is to provide an efficient, easily operative, inexpensive latch for the closure of poultry coops of the type having a sliding top panel for opening and closing the same.

To the accomplishment of the above, and subordinate objects presently appearing, a preferred embodiment of my invention has been illustrated in the accompanying drawings, set forth in detail in the succeeding description and defined in the claim appended hereto.

In the drawings:

Figure 1 is a view in perspective of a poultry coop embodying my improvements.

Figure 2 is a view in transverse section taken on the line 2—2 of Figure 1 looking in the direction indicated by the arrows, and Figure 3 is a view in perspective of the latch member and tension spring therefor.

Referring to the drawings by numerals, the type of poultry coop with which my invention is more particularly concerned is of crate-like form and comprises a bottom 1, skeleton sides and ends 2 and 3, respectively, and a top 4. The top 4 includes a pair of side boards 5 suitably secured at their ends to upper end cross bars 6 forming part of the ends 2, said boards being also secured in the center thereof to a center cross bar 7 extending across the coop beneath said top 4. The top 4 further includes a closure panel 8 intermediate said side boards 5 endwise slidable to open and close said top 4 in guideways 9 provided in the upper sides of the cross bars 6 and 7. Keeper bars 10 of strap iron, or the like, are suitably secured at the ends thereof to the end and center cross bars 6 and 7, respectively, as at 11, to extend along said cross bars over said closure panel 8 and confine the same in said guideways 9.

According to my invention latch means for the closure panel 8 are provided as follows:

A rod-like latch member 12 of inverted L shape and including a long leg 13 and a short rightangled extension 14 is mounted in the center cross bar 7 for vertical sliding and rotary movement alongside one edge of the closure panel 8, said member for this purpose having the long leg 13 thereof extended vertically through a vertical bore 15 provided in the center cross bar 7 and also through an aperture 15' provided in the center keeper bar 10. The lower end of the long leg 13 is split and spread, as at 16, and a tension spring 17 is sleeved onto said end between the center cross bar 7 and said split end, said spring opposing upward movement of said member. The extremity of the rightangled extension, or short leg 14, is downturned to provide a latch bolt 18 for insertion through an aperture 19 in the center keeper bar 10 into an aperture 20 provided in the closure panel 8 and registering with said aperture 19 in the closing position of said panel.

As will now be seen, the extension 14 provides a bail-like hand grip by means of which the member 12 may be lifted in opposition to the spring 17 and rotated to swing the latch bolt 18 into and from overlying relation to the center keeper bar 10 and closure panel 8 so that said bolt may be extended through the aperture 19 in said keeper bar into the aperture 20 in the closure panel to lock the latter closed, or, lifted out of said apertures to unlock the panel and swung clear of the panel into an out-of-the-way position. It will be apparent that with the latch bolt 18 located in the aperture 19 of the center keeper bar 10 and the closure panel 8 open, said bolt will ride on top of said panel to enter the aperture 20 thereof with a snap action under the urge of the spring 17 and when said panel is slid into closing position.

The foregoing will, it is believed, suffice to impart a clear understanding of my invention without further explanation.

Manifestly, the invention, as described, is susceptible of modification without departing from the inventive concept and right is herein reserved to such modifications as fall within the scope of the subjoined claim.

What I claim is:

Latch mechanism for a crate having a sliding top closure panel provided with an aperture, said mechanism comprising a cross bar having a notched upper edge forming a guide for the panel, a strap iron keeper extending along the bar and bridging the notch to retain the panel in the latter, a rod-like latch member having a leg extending downwardly through said keeper and bar and vertically slidable and rotatable therein, said leg having a rightangled upper end terminating in a downturned latch bolt rotatable into and from overlying position to said keeper and bar under rotation of the member, said bar and keeper being provided with a pair of apertures therein, respectively, aligning with the aperture in said panel in the closed position of the latter for the extension of the bolt therethrough under downward movement of said latch member, and means to tension said member against upward movement comprising a head on the lower end of said leg, and a coil spring sleeved onto said leg between said head and bar.

CHARLES EDGAR SHEETS.